United States Patent
Kirimoto et al.

(12) 
(10) Patent No.: US 6,334,514 B1
(45) Date of Patent: Jan. 1, 2002

(54) BICYCLE DISC BRAKE

(75) Inventors: Kanji Kirimoto, Kaizuka; Yoshiaki Ando, Kawachinagano; Kenji Ose, Sakai; Tadashi Ichida, Sakai; Toshio Tezuka, Sakai; Tatsuya Matsushita, Sakai, all of (JP)

(73) Assignee: Shimano Inc., Oasaka (JP)

( * ) Notice: Subject to any disclaimer, the term of this patent is extended or adjusted under 35 U.S.C. 154(b) by 0 days.

(21) Appl. No.: 09/495,946

(22) Filed: Feb. 2, 2000

(51) Int. Cl.[7] ............................................. F16D 65/14
(52) U.S. Cl. ............................ 188/73.41; 188/73.34; 188/344; 188/370
(58) Field of Search .................. 188/344, 18 A, 188/72.6, 73.31, 73.34, 73.39, 73.41, 73.42, 73.43, 73.44, 73.45, 73.46, 73.47, 370

(56) References Cited

U.S. PATENT DOCUMENTS

| | | | |
|---|---|---|---|
| 2,612,968 A | * 10/1952 | Hood | 188/73.32 |
| 3,292,739 A | * 12/1966 | Ulbing | 188/73.3 |
| 3,416,634 A | * 12/1968 | Swift | 188/73.32 |
| 3,438,465 A | * 4/1969 | Butler | 188/73.32 |
| 3,478,845 A | * 11/1969 | Kita | 188/73.32 |
| 3,675,741 A | * 7/1972 | Frei et al. | 188/73.34 |
| 3,765,511 A | * 10/1973 | Toyomasu | 188/73.32 |
| 3,878,921 A | * 4/1975 | Kibler et al. | 188/26 |
| 3,927,736 A | * 12/1975 | Bergles | 188/73.32 |
| 3,935,927 A | 2/1976 | Haraikawa | 188/73.3 |
| 3,942,611 A | * 3/1976 | Burnett | 188/73.32 |
| 3,949,838 A | * 4/1976 | Fuhrman | 188/73.32 |
| 3,976,169 A | * 8/1976 | Ogawa | 188/73.3 |
| 3,977,498 A | * 8/1976 | Ogawa | 188/73.3 |
| 4,022,297 A | * 5/1977 | Haraikawa | 188/73.32 |
| 4,036,328 A | * 7/1977 | Hoffman et al. | 188/73.32 |
| 4,084,666 A | * 4/1978 | Karasudami | 188/73.3 |
| 4,102,440 A | * 7/1978 | Wood | 188/72.7 |
| 4,120,536 A | 10/1978 | Bernardi | 301/6 E |
| 4,170,369 A | 10/1979 | Strutman | 280/261 |
| 4,222,464 A | * 9/1980 | Moriya et al. | 188/73.2 |
| 4,296,843 A | * 10/1981 | Nishiyama et al. | 188/73.43 |
| 4,301,895 A | * 11/1981 | Harrson et al. | 188/59 |
| 4,573,554 A | * 3/1986 | Ritsema | 188/73.38 |
| 4,574,923 A | * 3/1986 | Nakajima et al. | 1878/73.45 |
| 5,259,483 A | * 11/1993 | Pelfrey | 188/71.1 |
| 5,358,078 A | * 10/1994 | Gajek et al. | 188/72.4 |
| 5,950,772 A | 9/1999 | Buckley et al. | 188/26 |

FOREIGN PATENT DOCUMENTS

| | | | |
|---|---|---|---|
| EP | 699576 A | 3/1996 | B62L/1/00 |
| EP | 718182 A | 6/1996 | |
| FR | 2728321 | 6/1996 | F16D/55/36 |
| GB | 2076087 | 11/1981 | F16D/55/36 |
| GB | 2195407 | 4/1988 | F16D/55/22 |
| JP | 4894132 | 12/1973 | |

\* cited by examiner

*Primary Examiner*—Robert J. Oberleitner
*Assistant Examiner*—Benjamin A. Pezzlo
(74) *Attorney, Agent, or Firm*—Shinjyu Global IP Counselors, LLP

(57) ABSTRACT

A bicycle disc brake is provided in which a support member movably couples the brake caliper to the frame of the bicycle. The bicycle disc brake caliper has a caliper housing with a single piston unit. The piston unit is movably coupled to the housing between a release position, in which the piston unit is spaced from a disc brake mounted to a wheel of a bicycle, and a braking position, in which the piston unit engages the disc brake of the bicycle wheel. The piston unit has a first friction member movably coupled between a release position and a braking position and a second friction member arranged substantially parallel to the first friction member to form a disc brake receiving space between the first and second friction members. In one embodiment, the caliper housing is movably coupled to the support member by a pivot pin. In another embodiment, the caliper housing is movably coupled to the support member by a linkage assembly.

11 Claims, 4 Drawing Sheets

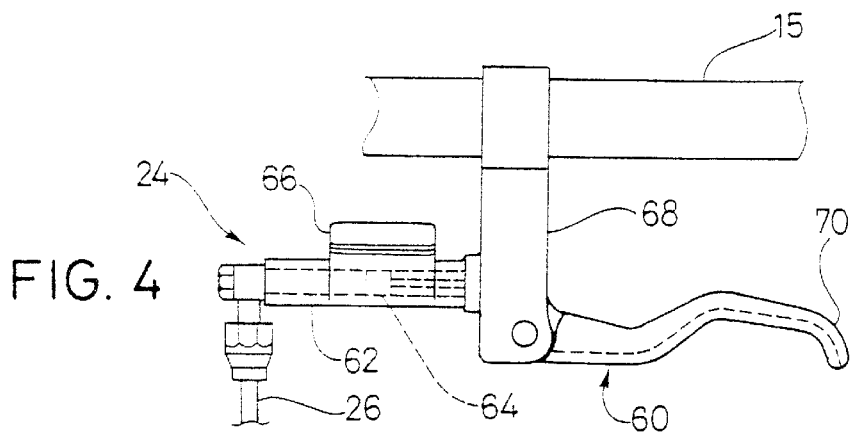
FIG. 4
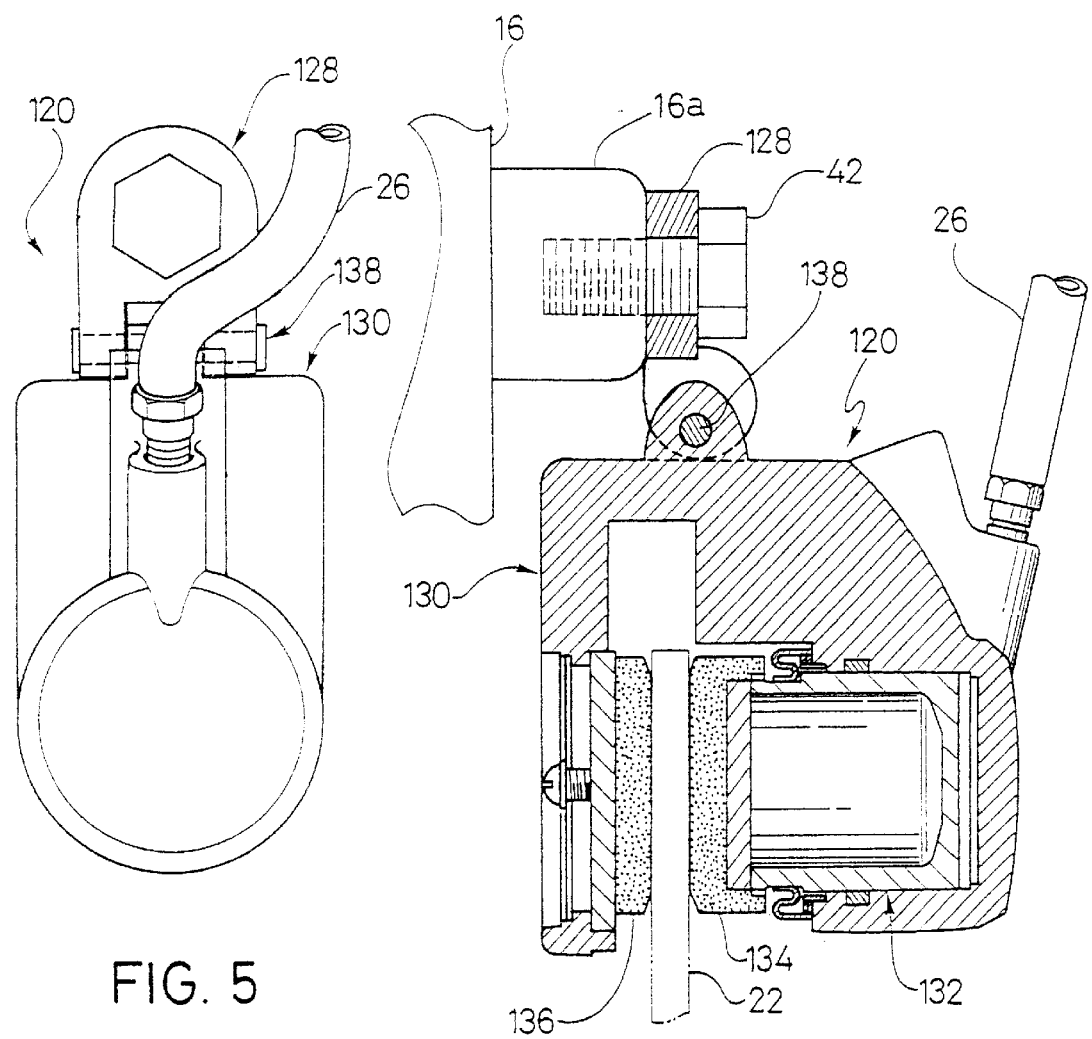
FIG. 5
FIG. 6

BICYCLE DISC BRAKE

BACKGROUND OF THE INVENTION

1. Field of the Invention

This invention generally relates to a bicycle disc brake. More specifically, the present invention relates to a disc brake with a floating caliper housing and a single piston unit

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving bicycle components. One particular component of the bicycle, which has been extensively redesigned over the past years, is the braking systems of bicycles. In particular, the braking power of the braking systems is constantly being increased.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. Of course, riders constantly desire better performance from disc brake systems, i.e., disc brake systems that have more braking power.

Currently, there are many types of disc brakes that are currently available on the market. One type of disc brake utilizes a pair of movable friction members or pads that move towards each other to squeeze the disc brake rotor. While these work very well, they are more expensive than a disc brake caliper with a fixed friction member and a movable friction member. However, one drawback to a disc brake with only one movable friction member is that the caliper housing must have some sort of floating arrangement to avoid bending the disc brake rotor.

In view of the above, there exists a need for a disc brake which overcomes the problems of prior art disc brakes without substantially increasing the weight or cost of manufacturing the disc brake. This invention addresses this need in the prior art as well as other needs, which will become apparent to those skilled in the art from this disclosure.

SUMMARY OF THE INVENTION

One object of the present invention is to provide a bicycle disc brake that has a support member pivotally coupling the disc brake caliper to the frame of the bicycle.

Another object of the present invention is to provide a bicycle disc brake that is relatively inexpensive to manufacture.

Another object of the present inventions is to provide a disc brake comprising a support member having an attachment portion adapted to be coupled to a portion of a vehicle; and a caliper housing pivotally coupled relative to the support member, the caliper housing including a piston unit with a first friction member movably coupled between a release position and a braking position and a second friction member arranged substantially parallel to the first friction member to form a disc brake rotor receiving space between the first and second friction members.

In one embodiment, a single pivot pin is utilized for pivotally coupling the caliper housing on the support member. The caliper housing of this embodiment can be either a one-piece housing, or a two-piece housing.

In another embodiment, the support member movably couples the disc brake caliper housing via a four-bar linkage.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4 is a top plan view of the brake operating mechanism mounted on the handle bar of the bicycle in accordance with the present invention illustrated in FIG. 1;

FIG. 5 is an enlarged side elevational view of the bicycle disc brake caliper in accordance with a second embodiment of the present invention;

FIG. 6 is an enlarged cross-sectional view the bicycle disc brake caliper in accordance with the second embodiment illustrated in FIG. 5;

DETAILED DESCRIPTION OF THE PREFERRED EMBODIMENTS

Figure 1:
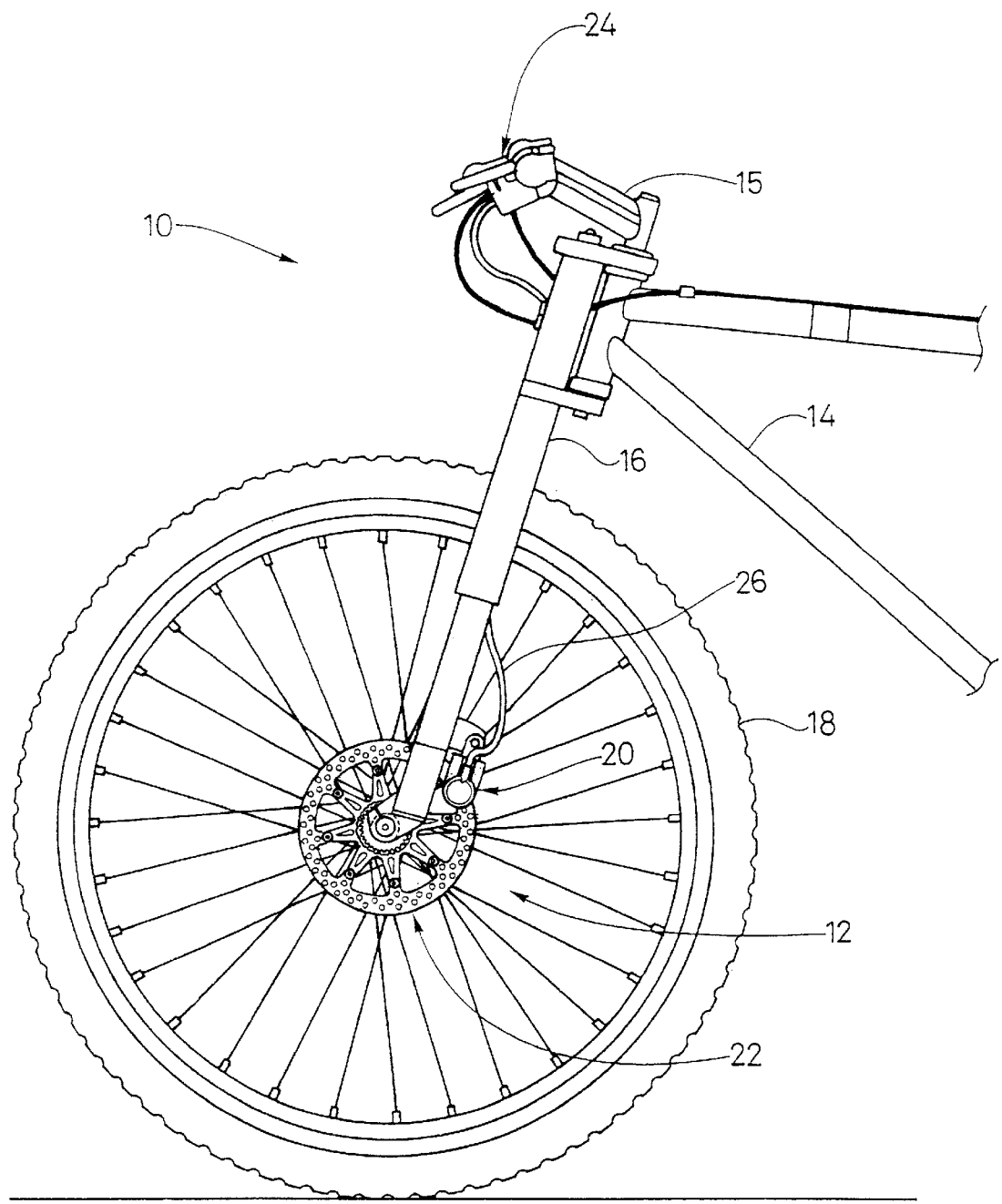
FIG. 1 is a side elevational view of a front portion of a bicycle with a bicycle disc brake assembly coupled thereto in accordance with a first embodiment of the present invention.
Figure 2:
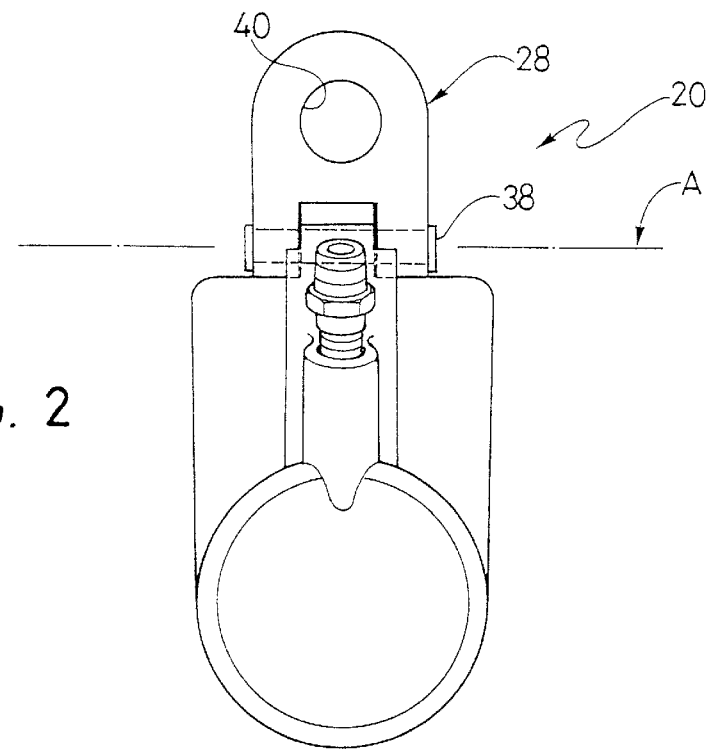
FIG. 2 is an enlarged side elevational view of the bicycle disc brake caliper in accordance with the first embodiment illustrated in FIG. 1.
Figure 3:
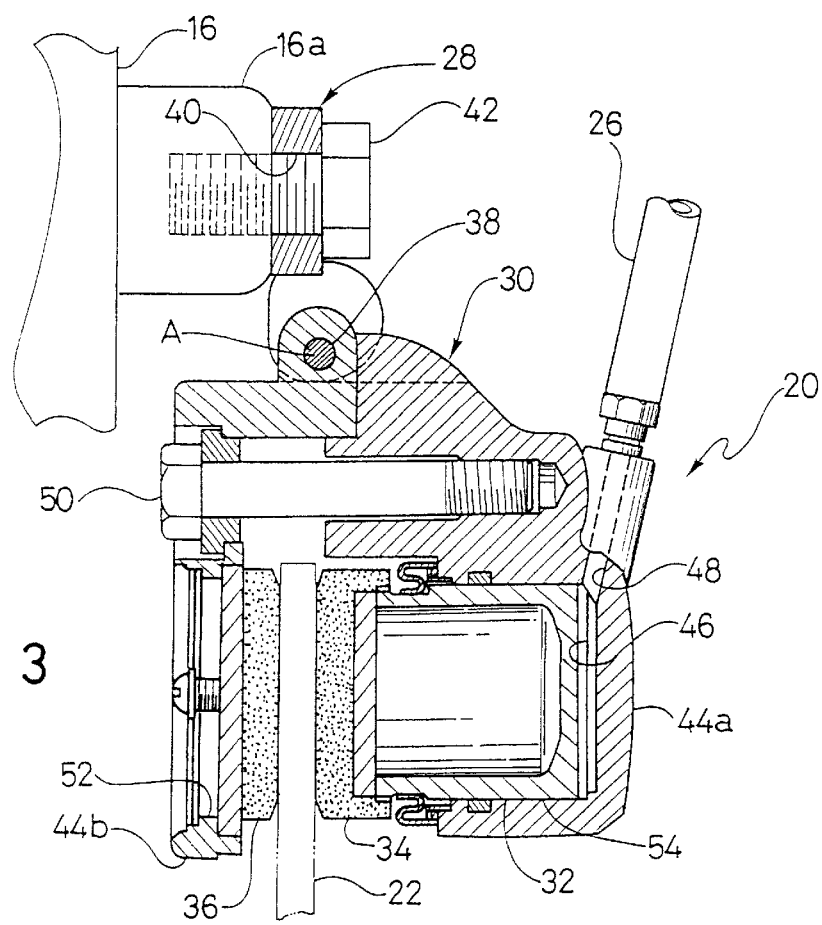
FIG. 3 is an enlarged, partial cross-sectional view the bicycle disc brake caliper in accordance with the first embodiment illustrated in FIGS. 1 and 2.

Referring initially to FIGS. 1–3, a front portion of a bicycle 10 is illustrated with a disc brake assembly 12 coupled thereto in accordance with one embodiment of the present invention. Bicycles such as bicycle 10 are well known in the art, and thus, bicycle 10 and its various components will not be discussed or illustrated in detail herein. It will be apparent to those skilled in the art that bicycle 10 can be any type of bicycle, e.g., mountain bike, a hybrid bike or a road bike. Bicycle 10 is a conventional bicycle, which basically includes a bicycle frame 14 with a handle bar 15, front and rear forks 16 (only front fork shown), front and rear wheels 18 (only front wheel shown) and a drive train (not shown).

While only the front portion of bicycle 10 is illustrated as having a disc brake assembly 12, it will be apparent to those skilled in the art from this disclosure that a second or rear disc brake assembly 12 can be utilized for stopping the rear wheel of bicycle 10.

Disc brake assembly 12 basically includes a disc brake caliper 20, a disc brake rotor 22 and a brake operating mechanism 24. Disc brake caliper 20 is mounted on front fork 16 of bicycle 12 adjacent disc brake rotor 22. Disc brake rotor 22 is fixedly coupled to the hub of the front wheel 18 for rotation therewith. Brake operating mechanism 24 is preferably fixedly mounted on handle bar 15 adjacent the hand portion of handle bar 15 as best seen in FIG. 4. Brake operating mechanism 24 is operatively coupled to disc brake caliper 20 by a brake fluid hose 26. Accordingly, brake operating mechanism 24 is operated such that disc brake caliper 20 moves from a release position in which bicycle wheel 18 and disc brake rotor 22 are free to rotate, and a braking position in which disc brake caliper 20 applies a braking force against disc brake rotor 22 to stop rotation of bicycle wheel 18 and disc brake rotor 22.

Referring to FIGS. 2 and 3, disc brake caliper 20 will now be described in more detail. Disc brake caliper 20 is fixedly coupled to front fork 16. Disc brake caliper 20 is located adjacent to disc brake rotor 22 by a support member 28 for applying a clamping force to stop the rotation of bicycle wheel 18 and disc brake rotor 22.

Disc brake caliper 20 basically includes support member 28, a caliper housing 30, a piston unit 32 and a pair of friction members 34 and 36 (i.e., first friction member 34 and second friction member 36). Disc brake caliper 20 is basically a conventional disc brake caliper, except that caliper housing 30 is pivotally coupled to support member 28 as explained below. Therefore, disc brake caliper 20 will not be discussed or illustrated in detail herein.

Support member 28 is pivotally coupled to the caliper housing 30 by pivot pin 38. In other words, the caliper housing 30 is pivotally supported by support member 28 about axis A of pivot pin 38. Pivot axis A extends substantially parallel to the disc brake rotor receiving space between the first and second friction members 34 and 36. Support member 28 has an attachment portion or hole 40, which receives a bolt 42 therethrough for coupling to a mounting portion 16a of the front fork 16.

The caliper housing 30 of this embodiment has a first and second housing portion 44a and 44b. The first and second housing portions 44a and 44b are constructed of a hard rigid material, such as aluminum. The first housing portion 44a movably supports piston unit 32 therein. More specifically, first housing portion 44a has a cylindrical piston recess 46 with the piston unit 32 slidably retained therein. The first housing portion 44a also has an internal fluid actuating passage 48 that is fluidly coupled to the brake operating mechanism 24 by the brake fluid hose 26. Thus, brake fluid enters the first housing portion 44a through the internal fluid actuating passage 48 and then into the piston recess 46 for pressurizing the piston recess 46. This pressure in the piston recess 46 causes the piston unit 32 to slide outwardly from the piston recess 46. Accordingly, the first friction member 34 that is coupled to the piston unit 32 is moved towards the second friction member 36 to squeeze the disc brake rotor 22 therebetween.

The second housing portion 44b is pivotally coupled to the first housing portion 44a via the pivot pin 38. A fastener or bolt 50 is also coupled between the first and second housing portions 44a and 44b to hold the second friction member 36 substantially parallel to the first friction member 34. The second housing portion 44b has an opening 52 with the second friction member 36 fixedly coupled therein. In other words, the second friction member 36 is a stationary friction member that is spaced from the first friction member 34.

As seen in FIG. 3, piston unit 32 preferably includes a single piston 54 with first friction pad or member 34 coupled thereto. Piston 54 is slidably received in piston recess 46 for movement between a release position and a braking position. Friction member 34 is located on the free end of piston 54 for movement therewith. Piston 54 and friction member 34 are moved from a release position to a braking position by actuating or hydraulic fluid applying a force to piston 54. More specifically, as brake operating mechanism 24 is actuated, actuating fluid is pressurized so as to force piston 54 with first friction member 34 toward disc brake rotor 22. In other words, as piston 54 moves from a release position to a braking position, first friction member 34 also moves from a release position to a braking position (towards second friction member 36). In the braking position, friction members 34 and 36 frictionally engage disc brake rotor 22 to stop the rotation of disc brake rotor 22 and wheel 18. In the release position, friction members 34 and 36 are spaced from disc brake rotor 22 to allow disc brake rotor 22 and wheel 18 to freely rotate therebetween.

Referring now to FIG. 4, brake operating mechanism 24 will now be described in more detail. Basically, brake operating mechanism 24 is designed to actuate the disc brake caliper 20 to apply a forcible gripping action on disc brake rotor 22 to stop rotation of front wheel 18. Brake operating mechanism 24 basically includes a brake lever 60, a hydraulic or master cylinder 62, a hydraulic or master piston 64, and an actuation fluid reservoir 66.

Preferably, brake operating mechanism 24 is a single unit which is mounted on handlebar 15. In particular, as best seen in FIG. 4, brake lever 60 includes a mounting portion 68 and a lever portion 70. Mounting portion 68 is designed to be clamped onto handle bar 15 in a conventional manner. Mounting portion 68 is integrally formed with master cylinder 62 such that master cylinder 62, master piston 64 and actuation fluid reservoir 66 are all supported on mounting portion 68 of brake lever 60. Lever portion 70 is pivotally coupled to mounting portion 68 for movement between a release position and a braking position. Normally, lever portion 68 is maintained in a release position in a conventional manner.

Master piston 64 is movably mounted within master cylinder 62 in a conventional manner. More specifically, actuation fluid reservoir 66 is mounted on master cylinder 62 and in fluid communication with the interior bore of master cylinder 62 for supplying actuation fluid thereto. Master piston 64 is connected at one end to lever portion 70 for axially moving master piston 64 within master cylinder 62. Accordingly, actuation of lever portion 70 causes master piston 64 to move axially within master cylinder 62. This movement of master piston 64 within master cylinder 62 directs fluid pressure through a hydraulic line or brake fluid hose 26 that is coupled to disc brake caliper 20. Thus, the pressurized actuation fluid causes the piston 54 with first friction member 34 to move so as to engage disc brake rotor 22 to stop rotation of wheel 18.

Second Embodiment

Referring now to FIGS. 5 and 6, a simplified disc brake caliper 120 is illustrated in accordance with a second embodiment of the present invention. Disc brake caliper 120 basically includes a support member 128, a caliper housing 130 pivotally coupled to support member 128 by pivot pin 138, a piston unit 132 and a pair of friction members 134 and 136. Disc brake caliper 120 is designed to replace the disc brake caliper 20 in disc brake assembly 12, discussed above. In fact, disc brake caliper 120 is substantially identical to disc brake caliper 20, except that disc brake caliper 120 has a one-piece caliper housing 130.

In view of the similarities between disc brake calipers 20 and 120, disc brake caliper 120 will not be discussed or illustrated in detail herein. Rather, it will be apparent to those skilled in the art from this disclosure that the description of disc brake caliper 20 applies to the features of disc brake caliper 120 that are similar to disc brake caliper 20. Moreover, it will be apparent to those skilled in the art from this disclosure that disc brake caliper 120 can be utilized on bicycle 10 of the first embodiment so as to be operated by brake operating mechanism 24 of the first embodiment to engage disc brake rotor 22.

Third Embodiment

Figure 7:
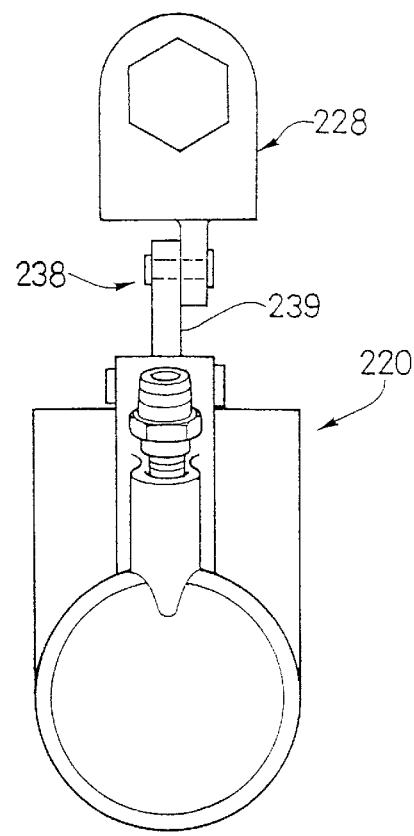
FIG. 7 is an enlarged side elevational view of the bicycle disc brake caliper in accordance with a third embodiment of the present invention.
Figure 8:
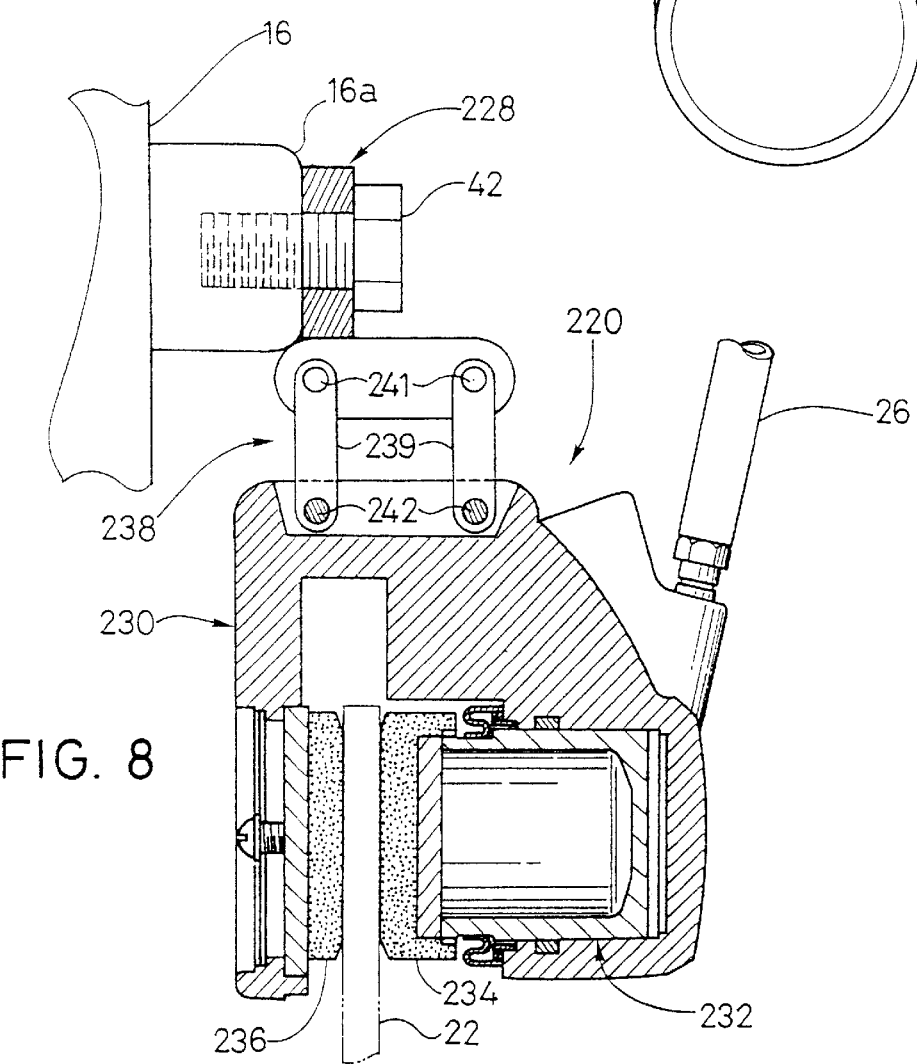
FIG. 8 is an enlarged cross-sectional view the bicycle disc brake caliper in accordance with the third embodiment illustrated in FIG. 7.

Referring now to FIGS. 7 and 8, a disc brake caliper 220 is illustrated in accordance with a third embodiment of the present invention. Disc brake caliper 220 basically includes a support member 228, a caliper housing 230, a piston unit 232 and a pair of friction members 234 and 236. Disc brake caliper 220 is designed to replace the disc brake caliper 20 in disc brake assembly 12, discussed above. Disc brake caliper 220 is substantially identical to disc brake caliper 20 discussed above, except that disc brake caliper 220 has a one-piece caliper housing 230 and a linkage assembly 238 for connecting the support member 228 to the caliper housing 230. In this third embodiment, the linkage assembly 238 has been added to pivotally mount the caliper housing 230 on support member 228.

The linkage assembly 238 basically has a pair of support links 239 that are pivotally connected at one end to the support member 228 by first pivot pins 241 and pivotally coupled at their other ends to the caliper housing 230 by second pivot pins 242. The links 239 are preferably parallel to each other so that caliper housing 230 can move side to side relative to the support member 228. The links 239 form a four bar linkage with the support member 228 and the caliper housing 230.

In view of the similarities between disc brake caliper 220 and disc brake caliper 20 of the first embodiment, disc brake caliper 220 will not be discussed or illustrated in detail herein. Rather, it will be apparent to those skilled in the art from this disclosure that the description of disc brake caliper 20 applies to the features of disc brake caliper 220 that are similar to disc brake caliper 20. Moreover, it will be apparent to those skilled in the art from this disclosure that disc brake caliper 220 can be utilized on bicycle 10 of the first embodiment so as to be operated by brake operating mechanism 24 of the first embodiment to engage disc brake rotor 22.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A disc brake comprising:
   a support member having an attachment portion adapted to be coupled to a portion of a vehicle;
   a caliper housing pivotally coupled relative to said support member about a pivot axis, said caliper housing including first and second housing portions fixedly, but releasably coupled together; and
   a piston unit including a first friction member movably coupled relative to said first housing portion between a release position and a braking position, and a second friction member coupled to said second housing portion and arranged substantially parallel to said first friction member to form a disc brake receiving space between said first and second friction members,
   said first and second housing portions being pivotally coupled relative to each other in opposite directions about said pivot axis to separate of said first and second friction members.

2. A disc brake according to claim 1, wherein
   said caliper housing is movably coupled to said support member by a pivot pin located along said pivot axis.

3. A disc brake according to claim 2, wherein
   said pivot pin extends substantially parallel to said disc brake receiving space between said first and second friction members.

4. A disc brake according to claim 2, wherein
   said second friction member is a stationary member that is fixedly coupled to said second caliper housing.

5. A disc brake according to claim 1, further comprising
   a fastener coupled between said first and second housing portions to hold said second friction member substantially parallel to said first friction member.

6. A disc brake according to claim 5, wherein
   said fastener includes a bolt that extends between said first and second housing portions.

7. A disc brake according to claim 6, wherein
   said second friction member is a stationary member that is fixedly coupled to said second caliper housing.

8. A disc brake comprising:
   a support member having an attachment portion adapted to be coupled to a portion of a vehicle; and
   a caliper housing pivotally coupled relative to said support member, said caliper housing including a piston unit with a first friction member movably coupled between a release position and a braking position and a second friction member arranged substantially parallel to said first friction member to form a disc brake receiving space between said first and second friction members,
   said caliper housing being pivotally coupled to said support member by a linkage assembly that forms a four bar linkage between said support member said caliper housing, said linkage assembly including at least one pivot pin having a pivot axis that extends substantially parallel to said disc brake receiving space between said first and second friction members.

9. A disc brake comprising:
   a support member having an attachment portion adapted to be coupled to a portion of a vehicle; and
   a caliper housing pivotally coupled relative to said support member, said caliper housing including a piston unit with a first friction member movably coupled between a release position and a braking position and a second friction member arranged substantially parallel to said first friction member to form a disc brake receiving space between said first and second friction members,
   said caliper housing being pivotally coupled to said support member by a linkage assembly that forms a four bar linkage between said support member said caliper housing.

10. A disc brake according to claim 9, wherein
    said second friction member is a stationary member that is fixedly coupled to said caliper housing.

11. A disc brake according to claim 1, wherein
    said second friction member is a stationary member that is fixedly coupled to said caliper housing.

* * * * *